(12) United States Patent
Sinapi et al.

(10) Patent No.: US 11,314,114 B2
(45) Date of Patent: Apr. 26, 2022

(54) DISPLAY DEVICE

(71) Applicant: AGC GLASS EUROPE, Louvain-la-Neuve (BE)

(72) Inventors: Fabrice Sinapi, Spy (BE); Etienne Degand, Wezembeek-Oppem (BE); Ingrid Marenne, Forville (BE); Zakaria Habibi, Braine l'Alleud (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 0 days.

(21) Appl. No.: 17/265,849

(22) PCT Filed: Aug. 7, 2019

(86) PCT No.: PCT/EP2019/071227
§ 371 (c)(1),
(2) Date: Feb. 4, 2021

(87) PCT Pub. No.: WO2020/030697
PCT Pub. Date: Feb. 13, 2020

(65) Prior Publication Data
US 2021/0294147 A1      Sep. 23, 2021

(30) Foreign Application Priority Data
Aug. 8, 2018   (EP) ..................... 18188012

(51) Int. Cl.
*G02F 1/1333*   (2006.01)
*C03C 15/00*    (2006.01)

(52) U.S. Cl.
CPC ........ *G02F 1/133331* (2021.01); *C03C 15/00* (2013.01)

(58) Field of Classification Search
None
See application file for complete search history.

(56) References Cited

U.S. PATENT DOCUMENTS 7,070,837 B2 *  7/2006  Ross .................... G06F 1/1626
                                                          428/1.1
2002/0154100 A1  10/2002  Hatakeda et al.
(Continued)

FOREIGN PATENT DOCUMENTS

| EP | 2 433 789 A1 | 3/2012 |
| EP | 3 246 297 A1 | 11/2017 |
| WO | WO 2007/059223 A1 | 5/2007 |

OTHER PUBLICATIONS

International Search Report dated Oct. 30, 2019 in PCT/EP2019/071227 filed on Aug. 7, 2019.

*Primary Examiner* — Richard H Kim
(74) *Attorney, Agent, or Firm* — Oblon, McClelland, Maier & Neustadt, L.L.P.

(57) ABSTRACT

A display device with a display element having a display surface and a cover glass sheet, having a first textured surface, such that the first textured surface is facing the display element. The first textured surface has a surface roughness defined by a first arithmetic amplitude value, Ra1, being equal to or greater than 0.12 μm (Ra1≥0.12 μm) and a first spacing value, Rsm1, being equal to or greater than 45 μm (Rsm1≥45 μm) both measured on an evaluation length of 12 mm and with a Gaussian filter of which the cut-off wavelength is 0.8 mm. The first textured surface is in direct contact with the display surface over at least a portion of a contact area of the first textured surface.

22 Claims, 2 Drawing Sheets

(56) References Cited

U.S. PATENT DOCUMENTS

| | | |
|---|---|---|
| 2007/0108900 A1 | 5/2007 | Boek et al. |
| 2012/0070614 A1 | 3/2012 | Takahashi et al. |
| 2012/0091488 A1 | 4/2012 | Vermersch et al. |
| 2015/0370390 A1 | 12/2015 | Takahashi et al. |
| 2016/0236975 A1* | 8/2016 | Sugimoto ............... C03C 3/093 |
| 2016/0280584 A1 | 9/2016 | Sinapi et al. |
| 2017/0276995 A1 | 9/2017 | Sato et al. |
| 2018/0251398 A1* | 9/2018 | Ikegami ............... G02B 5/0294 |
| 2019/0079339 A1* | 3/2019 | Fujii ................ G02F 1/133502 |

* cited by examiner

DISPLAY DEVICE

1. FIELD OF THE INVENTION

The present invention relates to a display device which provides excellent anti-newton ring properties.

2. BACKGROUND ART

Touch display applications and digital signal applications typically comprise a display element separated from a cover glass sheet by an air gap. This air gap usually helps in preventing the cover glass sheet to touch the display element and to improve ventilation.

In recent years, displays devices have increased in size. Current average sizes are about 65 inches and it is expected that future average sizes for displays will reach 75 inches and even more. Furthermore, there is a request in the market place to decrease the overall weight of the display device. One element thereof is the thickness of the cover glass sheet that should be kept as low as possible.

Increasing the size of the cover glass sheet raises the technical issue of providing cover glass sheets of higher flexibility. Indeed, for similar finger pressures, the glass flexion in the center of the cover glass sheet is proportional to the square of the length of the glass. Maintaining a minimal thickness of the cover glass sheet contribute as well to the glass flexibility. Therefore, the chances of such cover glass sheets to touch the display element does increase substantially. First of all, the friction between the cover glass sheet and the display element mechanically damages the surface of the display element. Secondly, when the cover glass sheets comes into contact with the display element when the cover glass sheet is pressed by the finger of the user, Newton's rings are caused around the contact part.

One solution provided in the art to avoid Newton-rings is to increase the air gap between the display element and cover glass sheet. However, increasing the air gap increases the parallax phenomenon whereby a displacement or difference in the apparent position of an object viewed along two different lines of sight increases. Another solution is to glue the cover glass sheet to the display element thereby avoiding parallax. However, this solution is very expensive, difficult to process and does not allow deconstruction and reconstruction in case of failure of the display device.

US2013/0008767 addresses the technical problem of Newton's rings and the glare phenomenon called sparkles in touch panel applications and provides an anti-newton ring sheet having an uneven layer substantially formed with a polymer resin by arranging a plurality of structures with peaks in a lattice-like formation.

US2016/0221315 addresses the technical issue of resistance to blocking, resistance to Newton's ring and obtaining clear images by providing a laminate film for touch panel devices. US2016/0221315 teaches to use a laminate comprising a substrate, a refractive index adjusting layer on the first surface of the substrate; a transparent conductive layer on the opposite surface, and a fine concavo-convex structure layer having an average interval between convexities of 400 nm or less on the second surface.

JP2012252038 discloses an optical film that can improve anti-glare property or anti-Newton ring property, and can display a sharp image without whitening. Such optical film comprises a transparent film and a hard coat layer formed on the transparent film, in which an uneven structure having an average interval Sm between apexes of protrusions ranging from 600 to 1500 μm and an arithmetic average roughness Ra of 0.04 to 0.2 μm is formed on the surface of the hard coat layer. The hard coat layer is formed by curing a composition comprising a curable resin precursor and cellulose nanofiber of specific diameter and length.

There is a need to provide a cost effective and efficient solution to design display devices, in particular of large dimensions, that provide anti-Newton-rings properties.

3. SUMMARY OF THE INVENTION

The present invention relates to a display device comprising a display element having a display surface and a cover glass sheet having a first textured surface, configured so that the first textured surface is facing the display element. The first textured surface has a surface roughness defined by a first arithmetic amplitude value, Ra1, being equal to or greater than 0.12 μm (Ra1≥0.12 μm) and a first spacing value, Rsm1, being equal to or greater than 45 μm (Rsm1≥45 μm) both measured on an evaluation length of 12 mm and with a Gaussian filter of which the cut-off wavelength is 0.8 mm. The first textured surface is in direct contact with the display surface over at least a portion of a contact area of the first textured surface.

Other aspects and advantages of the embodiments will become apparent from the following detailed description taken in conjunction with the accompanying drawings which illustrate, by way of example, the principles of the described embodiments.

4. BRIEF DESCRIPTION OF THE DRAWINGS

5. DETAILED DESCRIPTION OF THE INVENTION

It is an object of the present invention to provide a display device comprising a display element and a cover glass sheet, demonstrating excellent anti-Newton-ring properties, in particular when designed in large dimensions.

The present invention therefore relates to a display device comprising a display element having a display surface and a cover glass sheet having a first textured surface configured so that the first textured surface is facing the display element. The first textured surface of the cover glass sheet has a surface roughness defined by a first arithmetic amplitude value, Ra1, being equal to or greater than 0.12 μm (Ra1≥0.12 μm) and a first spacing value, Rsm1, being equal to or greater than 45 μm (Rsm1≥45 μm) both measured on an evaluation length of 12 mm and with a Gaussian filter of which the cut-off wavelength is 0.8 mm. Said first textured surface is in direct contact with the display surface over at least a portion of a contact area of the first textured surface.

Indeed, it has been surprisingly found that by texturing the inner surface of the glass sheet of the present invention such as to provide a surface roughness defined by a first arithmetic amplitude value, Ra1, being equal to or greater than 0.12 μm (Ra1≥0.12 μm) and a first spacing value, Rsm1, being equal to or greater than 45 μm (Rsm1≥45 μm) then such textured inner face of the cover glass sheet can be brought into direct contact to the surface of the display element without causing Newton rings, nor mechanically damaging the surface of the display element.

The cover glass sheet has a first textured surface (1) and a second surface (2) which can be further textured as well. Within the display device of the present invention, the first textured surface is facing the display element and therefore may also be referred to as the inner surface. The second surface is facing the exterior of the display device and may also be referred to as the outer surface. The second outer surface of the cover glass sheet is separated from the first inner surface by the thickness of the cover sheet.

Figure 1:
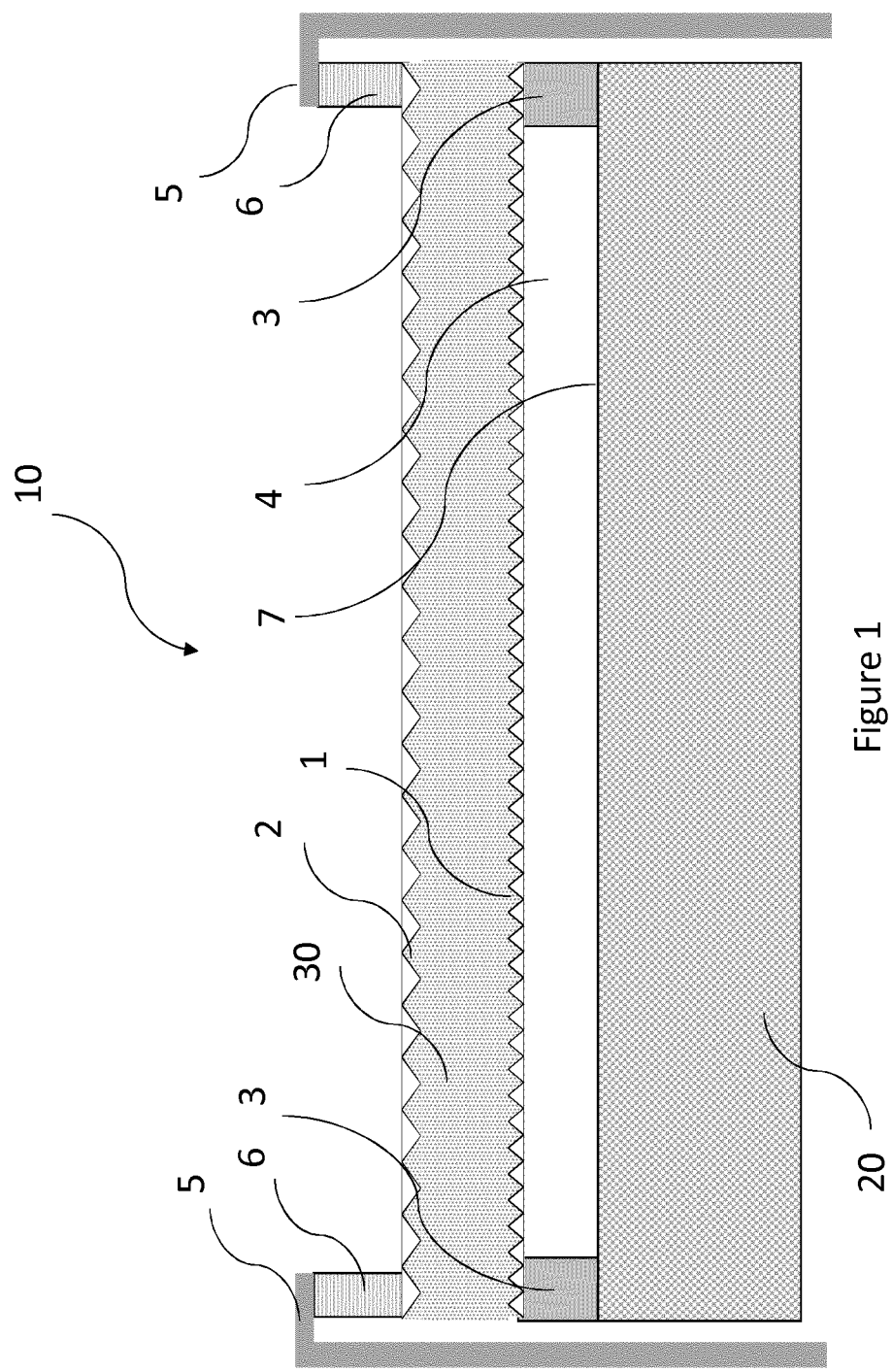
FIG. 1 shows a cross sectional view of display device comprising a device element and a cover glass sheet, of the prior art.

FIG. 1 illustrates a display device (10) of the prior art wherein the cover glass sheet (30) is typically separated from the display element (20) by a spacer (3) defining and air gap (4) and protected by a protective frame (5).

Figure 2:
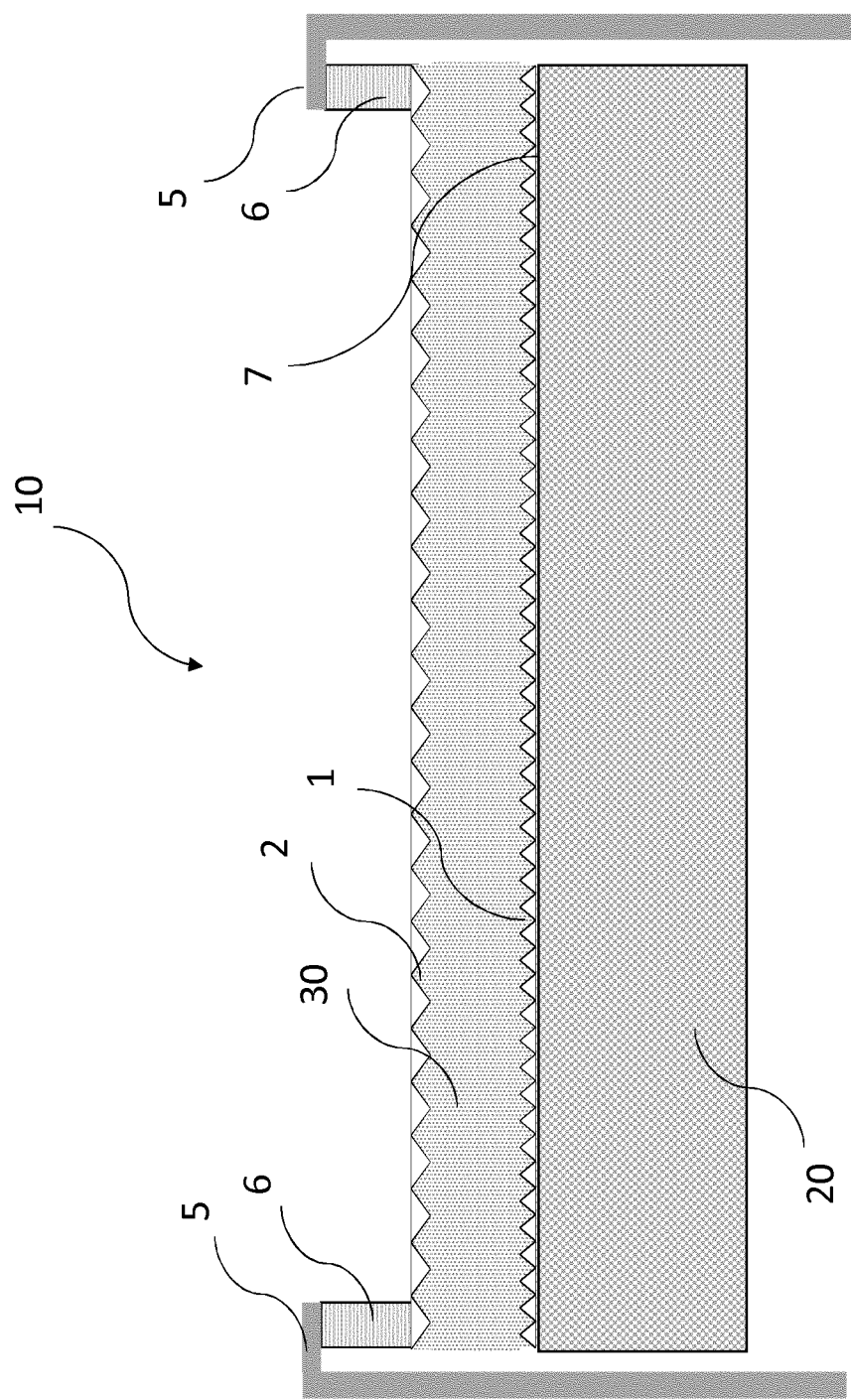
FIG. 2 shows a cross sectional view of display device comprising a device element and a cover glass sheet according to one embodiment of the present invention.

FIG. 2 illustrates a display device according to the present invention wherein the first textured surface (1) of the cover glass sheet (30) is in direct contact with the display surface (7) of the display element (20) without any spacer and protected by a protective frame (5).

Infrared touch sensors (6) may be used and located between the cover glass sheet and the protective frame.

The display element has a display surface which may be smooth, i.e. non-textured and therefore having a surface roughness defined by an arithmetic amplitude value, $Ra0$, being equal to or lower than 0.2 nm ($Ra0 \leq 0.2$ nm).

In another embodiment, the display element has a display surface which may be textured and therefore having a surface roughness defined by a display arithmetic amplitude value, $Rad$, and by a first spacing value, $Rsmd$.

In a preferred embodiment, the direct contact between the first textured surface of the cover glass sheet and the display surface of the display element is such that an average distance over the contact area between the first textured surface of the cover glass sheet and the display surface, $Dav$, is equal to or lower than the sum of the first arithmetic amplitude value, $Ra1$ and the display arithmetic amplitude value, $Rad$ ($Dav \leq (Ra1+Rad)$).

The glass cover sheet extends over a length, L, measured parallel to a longitudinal axis, X, and extends over a width, W, measured parallel to a transverse axis, Y, normal to X. In a preferred embodiment, said portion of the contact area is equal to or greater than 50%, preferably is equal to or greater than or equal to 80%, more preferably is equal to or greater than or equal to 90%, even more preferably is equal to or greater than or equal to 100%, of the surface of a projection of the glass cover sheet onto a plane parallel to X and Y. In the embodiments wherein the size of the cover glass sheet is greater than the size of the display element, said portion of the contact area can be indeed greater than 100%, preferably equal to or greater than or equal to 110%.

The cover glass sheet of the display device of the present invention, has a first surface facing the display element. The first face is textured to present a surface roughness defined by a first arithmetic amplitude value, $Ra1$, being equal to or greater than 0.12 μm ($Ra1 \geq 0.12$ μm) and a first spacing value, $Rsm1$, being equal to or greater than 45 μm ($Rsm1 \geq 45$ μm) both measured on an evaluation length of 12 mm and with a Gaussian filter of which the cut-off wavelength is 0.8 mm.

In a preferred embodiment, the first arithmetic amplitude value, $Ra1$, is comprised in the range of 0.12 μm≤$Ra1$≤0.5 μm, preferably in the range of 0.12 μm≤$Ra1$≤0.25 μm, more preferably in the range of 0.15 μm≤$Ra1$≤0.25 μm. In a preferred embodiment, the first spacing value, $Rsm1$, is comprised in the range of 45 μm≤$Rsm1$≤200 μm, preferably in the range of 45 μm≤$Rsm1$≤100 μm, more preferably in the range of 50 μm≤$Rsm1$≤100 μm.

The second surface of the cover glass sheet used within the display device of the present invention, is facing the exterior of the display device. The second surface may be further textured to provide anti-glare and anti-haze properties.

In a preferred embodiment, the second textured surface has a surface roughness having a second arithmetic amplitude value, $Ra2$, being equal to or greater than 0.08 μm ($Ra2 \geq 0.08$ μm) and a second spacing value, $Rsm2$, being equal to or greater than 45 μm ($Rsm2 \geq 45$ μm) both measured on an evaluation length of 12 mm and with a Gaussian filter of which the cut-off wavelength is 0.8 mm.

In a further preferred embodiment, the arithmetic amplitude value, $Ra2$, is comprised in the range of 0.08 μm≤$Ra2$≤0.5 μm, preferably in the range of 0.08 μm≤$Ra2$≤0.25 μm, more preferably in the range of 0.09 μm≤$Ra2$≤0.25 μm. In a further preferred embodiment, the second spacing value, $Rsm2$, is comprised in the range of 45 μm $Rsm2$≤200 μm, preferably in the range of 45 μm≤$Rsm2$≤100 μm, more preferably in the range of 50 μm≤$Rsm2$≤100 μm.

Glare deals with outer sources of reflection off a surface, such as bright sunlight or high ambient lighting conditions. Anti-glare properties are measured by the gloss optical property. Anti-glare properties uses diffusion mechanisms such as texturing, to break up the reflected light off the surface. The gloss characterizes the brightness or shine of a surface, and more particularly corresponding to the specular reflectance of a surface relative to a standard (such as, for example, a certified black glass standard). The gloss is measured in accordance with ASTM standard D523-14 "Standard Test Method for Specular Gloss" dated May 4, 2017, at the specific angle of 60° and it is expressed in SGU (standard gloss units). According to an advantageous embodiment of the invention, the second surface of the cover glass sheet has a gloss value at 60° of from 50 SGU to 120 SGU. More preferably, the glass sheet has a gloss value at 60° of from 60 SGU to 110 SGU.

Light passing through glass sheets can be affected by irregularities and the glass sheet surface roughness, causing light to scatter in different directions. The degree of light scattering depends on the size and number of irregularities present and of the surface roughness. Light scattering is responsible for transmission haze due to the loss of transmissive contrast. Diffusion mechanisms, reached for example by texturing, negatively affect the light reflection. The standard test method ASTM D 1003-11 defines haze as that percentage of transmitted light that is scattered so that its direction deviates more than an angle of 2.5° from the direction of the incident beam.

When designing cover glass sheets for display applications, both haze and glare properties should indeed be considered to improve or optimize readability of the displayed image or set of characters. Therefore, there is a compromise to be found between glare reduction and haze reduction of the surface since increasing texture/roughness of a glass surface generally leads to desired reduction of the glare but undesired increase in haze. It has been found that the texturing of the second surface of the glass cover with such arithmetic amplitude and spacing values, provide superior anti-haze and anti-glare properties.

It is preferred for display applications that cover glass sheets provide a low total transmission haze. Therefore, in a preferred embodiment, the total transmission haze, i.e. the haze of the cover glass sheet wherein the first surface is textured and eventually the second surface is further textured, the total transmission haze value of the cover glass sheet is preferably equal to or lower than 10% (Haze-tot≤10%), preferably equal to or lower than 8% (Haze-tot≤8%), more preferably equal to or lower than 5% (Haze-tot≤5%). Haze measurements are performed according to ASTM standard D1003-11 "Standard Test Method for Haze and Luminous Transmittance of Transparent Plastics", dated November 2011, with illuminant A, as per procedure A achieved with a hazemeter. Please refer to paragraph 7 of such standard test method.

Texturing a glass surface is widely used in the display industry. Texturing can be produced by several known methods like (i) removal of material from the smooth glass surface by chemical-etching or sandblasting or (ii) the application on the smooth surface of a rough coating by, for example, spraying, polymer web-coating or dip-coating.

According to the invention, both surfaces of the cover glass sheet are textured. By "etched surface", it is meant a surface which has been attacked by a mechanical or chemical way, removing a certain amount of glass material and giving a specific surface texture/roughness. We talk about chemically-etched glass when material removal occurs by chemical reactions/attack (i.e. acid etching). We talk about mechanically-etched glass when material removal occurs by mechanical reactions/attack (i.e. sandblasting).

According to the invention, the textured surface may be textured advantageously over substantially the entire glass surface, i.e. over at least 90% of the glass surface.

The textured surface of a glass sheet is usually characterized by its surface texture or roughness, and in particular, by the Ra and Rsm values (expressed as microns) defined in the standard ISO 4287-1997. The texture/roughness is a consequence of the existence of surface irregularities/patterns. These irregularities consist of bumps called "peaks" and cavities called "valleys". On a section perpendicular to the textured surface, the peaks and valleys are distributed on either side of a "center line" (algebraic average) also called "mean line". In a profile and for a measurement along a fixed length (called "evaluation length"):
- Ra (amplitude value) corresponds to the average difference of texture, meaning the arithmetic average of absolute values of differences between the peaks and valleys. Ra measure the distance between this average and the "line" and gives an indication of the height of the patterns on the textured surface;
- Rsm (spacing value) is the average distance between two successive passages of the profile through the "mean line"; and this gives the average distance between the "peaks" and therefore the average value of the widths of the patterns.

The roughness values according to the invention may be measured with a profilometer using 2D profiles (according to ISO4287 standard). Alternatively, one can use the technique of 3D profilometry (according to ISO 25178 standard) but isolating a 2D profile which then gives access to the parameters defined in the ISO4287 standard.

According to the invention, the roughness values are measured with a Gaussian filter, which is a filter of long wavelengths, also called profile filter λc. It is used for separating the components of roughness/texture from components of undulation of the profile.

The evaluation length, L, according to the invention is the length of the profile used to evaluate the roughness. Base length, l, is the part of the evaluation length used to identify irregularities characterizing the profile to assess. The evaluation length, L, is divided/cut into n base lengths, l, which depend on the profile irregularities. The base length, l, corresponds to the "cut-off" wavelength (or limit wavelength) of the Gaussian filter (l=λc). Typically, the evaluation length is of at least five times the base length.

In roughness measurements, a short wavelength filter (profile filter λs) is also commonly used to eliminate the effects of very short wavelengths which are background noise.

The cover glass sheet according to the invention is made of glass whose matrix composition is not particularly limited and may thus belongs to different categories. The glass may be a soda-lime-silicate glass, an alumino-silicate glass, an alkali-free glass, a boro-silicate glass, etc. Preferably, the glass sheet of the invention is made of a soda-lime glass or an alumino-silicate glass.

According to an embodiment of the invention, the glass sheet has a composition comprising, in a content expressed in percentages of the total weight of the glass:

| | |
|---|---|
| $SiO_2$ | 55-85% |
| $Al_2O_3$ | 0-30% |
| $B_2O_3$ | 0-20% |
| $Na_2O$ | 0-25% |
| CaO | 0-20% |
| MgO | 0-15% |
| $K_2O$ | 0-20% |
| BaO | 0-20%. |

In a preferred manner, the glass sheet has a composition comprising, in a content expressed in percentages of the total weight of the glass:

| | |
|---|---|
| $SiO_2$ | 55-78% |
| $Al_2O_3$ | 0-18% |
| $B_2O_3$ | 0-18% |
| $Na_2O$ | 5-20% |
| CaO | 0-10% |
| MgO | 0-10% |
| $K_2O$ | 0-10% |
| BaO | 0-5%. |

In a more preferred manner, the glass sheet has a composition comprising, in a content expressed in percentages of the total weight of the glass:

| | |
|---|---|
| $SiO_2$ | 65-78% |
| $Al_2O_3$ | 0-6% |
| $B_2O_3$ | 0-4% |
| CaO | 0-10% |
| MgO | 0-10% |
| $Na_2O$ | 5-20% |
| $K_2O$ | 0-10% |
| BaO | 0-5%. |

Such a soda-lime-type base glass composition has the advantages to be inexpensive even if it is less mechanically resistant as such.

Ideally, according to this last embodiment, the glass composition does not comprise $B_2O_3$ (meaning that it is not intentionally added, but could be present as undesired impurities in very low amounts).

In a alternative more preferred manner, the glass sheet has a composition comprising, in a content expressed in percentages of the total weight of the glass:

| | |
|---|---|
| $SiO_2$ | 55-70% |
| $Al_2O_3$ | 6-18% |
| $B_2O_3$ | 0-4% |
| CaO | 0-10% |
| MgO | 0-10% |
| $Na_2O$ | 5-20% |
| $K_2O$ | 0-10% |
| BaO | 0-5%. |

Such an alumino-silicate-type base glass composition has the advantages to be more mechanically resistant but it is more expensive than soda-lime.

Ideally, according to this last embodiment, the glass composition does not comprise $B_2O_3$ (meaning that it is not intentionally added, but could be present as undesired impurities in very low amounts).

According to an advantageous embodiment of the invention, combinable with previous embodiments on base glass composition, the glass sheet has a composition comprising a total iron (expressed in terms of $Fe_2O_3$) content ranging from 0.002 to 0.06 wt %. A total iron (expressed in the form of $Fe_2O_3$) content of less than or equal to 0.06 wt % makes it possible to obtain a glass sheet with almost no visible coloration and allowing a high degree of flexibility in aesthetic designs (for example, getting no distortion when white silk printing of some glass elements of smartphones). The minimum value makes it possible not to be excessively damaging to the cost of the glass as such, low iron values often require expensive, very pure, starting materials and also purification of these. Preferably, the composition comprises a total iron (expressed in the form of $Fe_2O_3$) content ranging from 0.002 to 0.04 wt %. More preferably, the composition comprises a total iron (expressed in the form of $Fe_2O_3$) content ranging from 0.002 to 0.02 wt %. In the most preferred embodiment, the composition comprises a total iron (expressed in the form of $Fe_2O_3$) content ranging from 0.002 to 0.015 wt %.

According to another embodiment of the invention, in combination with previous embodiments on $Fe_2O_3$ content, the glass has a composition comprising chromium in a content such as: $0.0001\% \leq Cr_2O_3 \leq 0.06\%$, expressed in percentages of the total weight of glass. Preferably, the glass has a composition comprising chromium in a content such as: $0.002\% \leq Cr_2O_3 \leq 0.06\%$. This chromium content allows getting a glass with a higher IR transmission and it is thus advantageous when using the glass sheet in a touch panel using optical IR touch technologies like, for example, the Planar Scatter Detection (PSD) or Frustrated Total Inner Reflection (FTIR) (or any other technology requiring high transmission of IR radiation) in order to detect the position of one or more objects (for example, a finger or a stylus) on a surface of the glass sheet.

The glass sheet of the invention may be a drawn glass sheet or a float glass sheet. According to an embodiment, the glass sheet of the invention is a float glass sheet. The term "float glass sheet" is understood to mean a glass sheet formed by the float process, which consists in pouring the molten glass onto a bath of molten tin, under reducing conditions. A float glass sheet comprises, in a known way, a "tin face", that is to say a face enriched in tin in the body of the glass close to the surface of the sheet. The term "enrichment in tin" is understood to mean an increase in the concentration of tin with respect to the composition of the glass at the core, which may or may not be substantially zero (devoid of tin). Therefore, a float glass sheet can be easily distinguished from sheets obtained by other glassmaking processes, in particular by the tin oxide content which may be measured, for example, by electronic microprobe to a depth of ~10 microns.

The glass sheet according to the invention may have a thickness of from 0.1 to 25 mm. Advantageously, the glass sheet according to the invention has preferably a thickness of from 0.1 to 6 mm. More preferably, for reasons of weight, the thickness of the cover glass sheet according to the invention is of from 0.1 to 2.1 mm.

The cover glass sheet according to the invention can advantageously be prestressed glass. By prestressed glass, it means a heat strengthened glass, a thermally toughened glass, or a chemically strengthened glass. Heat strengthened glass is heat treated using a method of controlled heating and cooling which places the glass surfaces under compression and the glass core under tension. This heat treatment method delivers a glass with a bending strength greater than annealed glass but less than thermally toughened safety glass.

Thermally toughened safety glass is heat treated using a method of controlled heating and cooling which puts the glass surface under compression and the glass core under tension. Such stresses cause the glass, when impacted, to break into small granular particles instead of splintering into jagged shards. The granular particles are less likely to injure occupants or damage objects.

The chemical strengthening of a glass article is a heat induced ion-exchange, involving replacement of smaller alkali sodium ions in the surface layer of glass by larger ions, for example alkali potassium ions. Increased surface compression stress occurs in the glass as the larger ions "wedge" into the small sites formerly occupied by the sodium ions. Such a chemical treatment is generally carried out by immerging the glass in an ion-exchange molten bath containing one or more molten salt(s) of the larger ions, with a precise control of temperature and time. Aluminosilicate-type glass compositions, such as for example those from the products range DragonTrail® from Asahi Glass Co. or those from the products range Gorilla® from Corning Inc., are also known to be very efficient for chemical tempering.

According to the applications, intended use and/or properties desired, various layer(s)/treatment(s) can be deposited/done on the cover glass sheet of the invention, on one or both faces of the cover glass sheet.

According to one embodiment of the invention, the glass sheet is coated with at least one transparent and electrically conducting thin layer. A transparent and conducting thin layer according to the invention can, for example, be a layer based on $SnO_2$:F, $SnO_2$:Sb or ITO (indium tin oxide), ZnO:Al or also ZnO:Ga.

According to another embodiment of the invention, the glass sheet is coated with at least one antireflection layer. Advantageously, according to this embodiment, the cover glass sheet is coated with said antireflection layer on the second surface. This embodiment is advantageous in the case of use of the glass sheet of the invention as front cover of a screen. An antireflection layer according to the invention can, for example, be a layer based on porous silica having a low refractive index or it can be composed of several layers (stack), in particular a stack of layers of dielectric material alternating layers having low and high refractive indexes and terminating in a layer having a low refractive index.

According to still another embodiment, the glass sheet has at least one anti-fingerprint layer/treatment so as to reduce or prevent fingerprints from registering. Advantageously, according to this embodiment, the glass sheet has said anti-fingerprint layer/treatment on the second surface. Such a layer/treatment can be combined with a transparent and electrically conducting thin layer deposited on the opposite face. Such a layer/treatment can be combined with an antireflection layer deposited on the same face.

According to still another embodiment of the invention, the glass sheet has an antibacterial layer/treatment. Advantageously, according to this embodiment, the glass sheet has said antibacterial layer/treatment on the second surface. For example, such an antibacterial treatment could be a diffusion of silver ions in the bulk of the glass sheet close to the outer surface.

Embodiments of the invention will now be further described, by way of examples only, together with some comparative examples, not in accordance with the invention. The following examples are provided for illustrative purposes, and are not intended to limit the scope of this invention.

EXAMPLES

Gloss measurements were performed according to ASTM standard D523 at a specific angle of 60°, with a glossmeter—Micro-Tri Gloss from BYK. Surface roughness measurements were performed using a 3D optical profiler Leica Type DCM3D, using the "Leica map" software, on an evaluation length of 12 mm and with a Gaussian filter of which the cut-off wavelength is 0.8 mm. The sample is first cleaned with detergent and dry. It is then placed under the microscope and after conventional settings, the profile of a 2D acquisition is then initiated (the software applies a default cut-off wavelength $\lambda s$ of 2.5 microns). Haze is measured on the cover glass sheet by the standard test method ATSM D1003 with illuminant A. Note that the haze value measured via ATSM D1003 is the same whatever surface of the cover glass sheet is illuminated within the hazemeter.

The exemplified cover glass sheet of examples 1 to 3 are soda-lime compositions of the following composition, in weight percentages:

| | |
|---|---|
| $SiO_2$ | 73.27% |
| $Na_2O$ | 13.9% |
| CaO | 7.9% |
| MgO | 4.5% |
| $K_2O$ | 0.07% |
| $Al_2O_3$ | 0.1% |
| SO3 | 0.2% |
| $TiO_2$ | 0.06% |

Examples 1 and 2

A display device was designed with the cover glass sheet of examples 1 and 2 below, wherein the first textured surface is in direct contact with the display surface of the display element. The first surface of the cover glass sheet has been textured as described in the table below and is positioned in direct contact to the display surface of the display element without causing Newton rings. Such cover glass sheet further provides superior gloss and haze properties.

| | Ra1 (μm) | Rsm1 (μm) | Gloss (SGU) | HazeTot (%) |
|---|---|---|---|---|
| Example 1 | 0.13 | 61 | 90 | 3.6 |
| Example 2 | 0.16 | 65 | 80 | 3.9 |

Example 3

A display device was designed with the cover glass sheet of example 3 below, wherein the first textured surface is in direct contact with the display surface of the display element. The cover glass sheet was prepared by coupling a VRD VCLO 110 soda-lime etched glass as the first, inner surface of the cover glass sheet via the Immersion Liquid Index from Cargill with refractive index 1.52, to a VRD VCLO 90 soda-lime etched glass as the second outer surface of the cover glass sheet. VRD VCLO 90 and VRD VCLO 110 are commercially available glass sheets from AGC Glass Europe.

| | Ra1 (μm) | Rsm1 (μm) | Ra2 (μm) | Rsm2 (μm) | Gloss2 (SGU) | HazeTot (%) |
|---|---|---|---|---|---|---|
| VRD VCLO 110 + 90 | 0.209 | 96.1 | 0.326 | 111 | 88.9 | 4.3 |

The first surface of the cover glass sheet is positioned in direct contact to the display surface of the display element without causing Newton rings. Such cover glass sheet further provides superior gloss and anti-haze properties.

| Ref. # | Feature |
|---|---|
| 10 | Display device |
| 20 | Display element |
| 30 | Cover glass sheet |
| 1 | First surface of the cover glass sheet |
| 2 | Second surface of the cover glass sheet |
| 3 | Spacer |
| 4 | Air gap |
| 5 | Protective frame |
| 6 | Infrared touch sensor |
| 7 | Display surface |

The invention claimed is:

1. A display device comprising a display element having a display surface and a cover glass sheet, having a first textured surface, configured so that the first textured surface is facing the display element,
   wherein the first textured surface has a surface roughness defined by a first arithmetic amplitude value, Ra1, being equal to or greater than 0.12 μm (Ra1≥0.12 μm) and a first spacing value, Rsm1, being equal to or greater than 45 μm (Rsm1≥45 μm) both measured on an evaluation length of 12 mm and with a Gaussian filter of which the cut-off wavelength is 0.8 mm, and
   wherein the first textured surface is in direct contact with the display surface over at least a portion of a contact area of the first textured surface.

2. The display device according to claim 1, wherein the display surface is textured to present a surface roughness defined by a display arithmetic amplitude value, Rad, and wherein the direct contact is such that an average distance, over the contact area between the first textured surface of the cover glass sheet and the display surface, Dav, is lower than or equal to the sum of the first arithmetic amplitude value, Ra1 and the display arithmetic amplitude value, Rad, (Dav≤(Ra1+Rad)).

3. The display device according to claim 1, wherein the first arithmetic amplitude value, Ra1, of the cover glass sheet is in the range of 0.12 μm≤Ra1≤0.5 μm.

4. The display device according to claim 1, wherein the cover glass sheet has a second textured surface presenting a surface roughness defined by a second arithmetic amplitude value, Ra2, being equal to or greater than 0.08 μm (Ra2≥0.08 μm) and a second spacing value, Rsm2, being equal to or greater than 45 μm (Rsm2≥45 μm) both measured on an evaluation length of 12 mm and with a Gaussian filter of which the cut-off wavelength is 0.8 mm.

5. The display device according to claim 4, wherein the second arithmetic amplitude value, Ra2, of the cover glass sheet, is in the range of 0.08 μm≤Ra2≤0.5 μm.

6. The display device according to claim 4, wherein the second spacing value, Rsm2, of the cover glass sheet, is in the range of 45 μm≤Rsm2≤200 μm.

7. The display device according to claim 4, wherein the second textured surface has a gloss value at 60° in the range of 50 SGU to 120 SGU.

8. The display device according to claim 4, wherein the second arithmetic amplitude value, Ra2, of the cover glass sheet, is in the range of 0.08 μm≤Ra2≤0.25 μm.

9. The display device according to claim 4, wherein the second arithmetic amplitude value, Ra2, of the cover glass sheet, is in the range of 0.09 μm≤Ra2≤0.25 μm.

10. The display device according to claim 4, wherein the second spacing value, Rsm2, of the cover glass sheet, in the range of 45μm≤Rsm2≤100 μm.

11. The display device according to claim 4, wherein the second spacing value, Rsm2, of the cover glass sheet, is in the range of 50 μm≤Rsm2≤100 μm.

12. The display device according to claim 4, wherein the second textured surface has a gloss value at 60° in the range of 60 SGU to 110 SGU.

13. The display device according to claim 1, wherein the first spacing value, Rsm1, of the cover glass sheet, is in the range of 45 μm≤Rsm1≤200 μm.

14. The display device according to claim 1, wherein the cover glass sheet has a total transmission haze value, Hazetot, equal to or lower than 10% (Hazetot≤10%).

15. The display device according to claim 1, wherein the first arithmetic amplitude value, Ra1, of the cover glass sheet is in the range of 0.12 μm≤Ra1≤0.25 μm.

16. The display device according to claim 1, wherein the first arithmetic amplitude value, Ra1, of the cover glass sheet is in the range of 0.15 μm≤Ra1≤0.25 μm.

17. The display device according to claim 1, wherein the first spacing value, Rsm1, of the cover glass sheet, is in the range of 45 μm≤Rsm1≤100 μm.

18. The display device according to claim 1, wherein the first spacing value, Rsm1, of the cover glass sheet, is in the range of 50 μm≤Rsm1≤100 μm.

19. The display device according to claim 1, wherein the cover glass sheet has a total transmission haze value, Hazetot, equal to or lower than 8% (Hazetot≤8%).

20. The display device according to claim 1, wherein the cover glass sheet has a total transmission haze value, Hazetot, equal to or lower than 5% (Hazetot≤5%).

21. The display device according to claim 1, wherein the portion of the contact area is equal to or greater than 50% of a surface of a projection of the cover glass sheet onto a plane parallel to X and Y where X is parallel to a length L of the cover glass sheet and Y is parallel to width W of the cover glass sheet.

22. The display device according to claim 1, wherein the portion of the contact area is equal to or greater than 80% of a surface of a projection of the cover glass sheet onto a plane parallel to X and Y where X is parallel to a length L of the cover glass sheet and Y is parallel to width W of the cover glass sheet.

* * * * *